(12) United States Patent
Droz

(10) Patent No.: US 6,352,604 B2
(45) Date of Patent: *Mar. 5, 2002

(54) METHOD FOR MAKING CARDS AND CARDS OBTAINED BY THIS METHOD

(75) Inventor: François Droz, La Chaux-de-Fonds (CH)

(73) Assignee: NagraID S.A., La Chaux-de-Fonds (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,753
(22) PCT Filed: Nov. 12, 1996
(86) PCT No.: PCT/CH96/00404
 § 371 Date: Jun. 18, 1999
 § 102(e) Date: Jun. 18, 1999
(87) PCT Pub. No.: WO98/21036
 PCT Pub. Date: May 22, 1998

(51) Int. Cl.$^7$ .............................................. B32B 31/20
(52) U.S. Cl. ....................... 156/196; 156/300; 156/322; 264/280; 264/319
(58) Field of Search ................................ 156/196, 228, 156/242, 245, 292, 297, 298, 299, 300, 309.6, 322; 264/280, 284, 293, 319, 322

(56) References Cited

U.S. PATENT DOCUMENTS

| 4,871,503 A | * 10/1989 | Ishii et al. | ................... 264/248 |
| 5,585,618 A | * 12/1996 | Droz | ........................... 235/492 |
| 5,817,207 A | * 10/1998 | Leighton | ..................... 156/298 |

* cited by examiner

Primary Examiner—Jeff H. Aftergut
Assistant Examiner—John T. Haran
(74) Attorney, Agent, or Firm—Clifford W. Browning; Woodard, Emhardt, Naughton, Moriarty & McNett

(57) ABSTRACT

The invention concerns a method for making smart cards by rolling. A first synthetic sheet (1) is first smoothed by hot pressing against a first smoothing plate (4). Likewise a second synthetic sheet (2) is smoothed against a second smoothing plate (5). Without being unstuck from their smoothing plates, these two sheets are rolled with other layers (3, 6, 7), said synthetic sheets (1, 2) serving as external layers. One of the smoothing plates may comprise a three-dimensional pattern to be relief printed on the synthetic sheet. The rolling is carried out by cold pressing the different layers (1, 6, 3, 7, 2) which the laminated card comprises between the two smoothing plates (4, 5). After being rolled, different cards with adapted dimensions can be cut out from the laminated sheets. The invention is advantageous in that the same plates (4, 5) are used for the hot pressing and the cold rolling. The external surface of the synthetic sheets (1, 2) thus remains protected between these two operations and the cards have better inherent flatness.

21 Claims, 5 Drawing Sheets

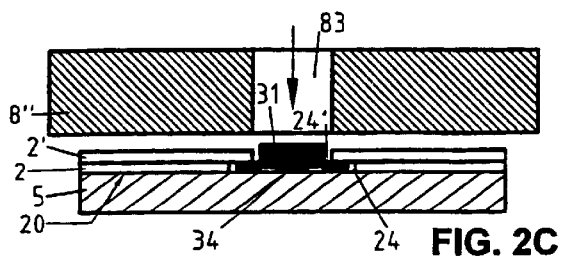 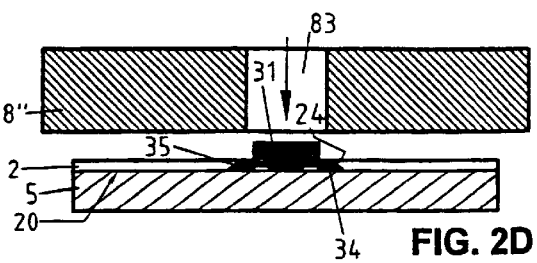
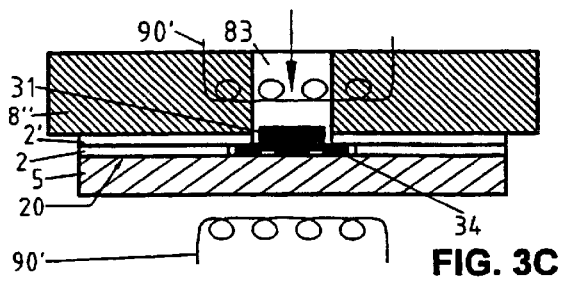 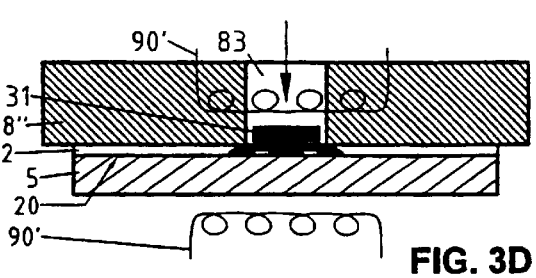
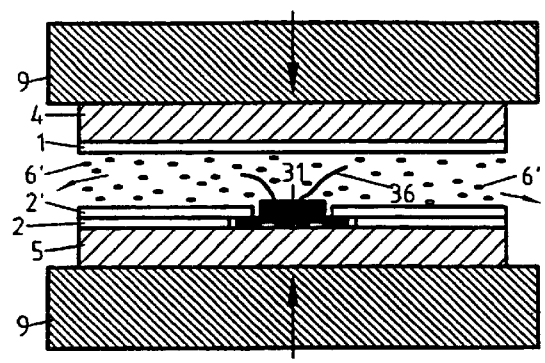
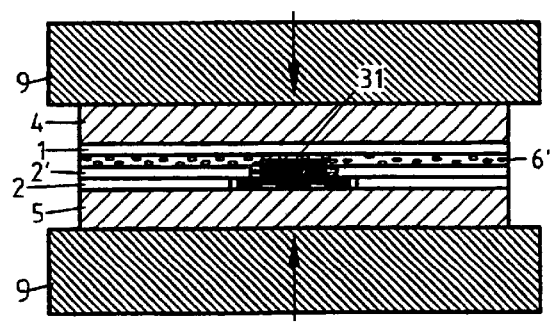
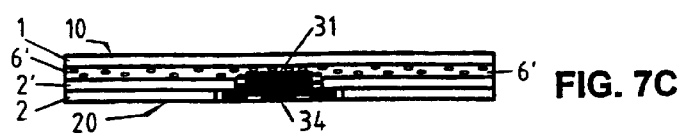

METHOD FOR MAKING CARDS AND CARDS OBTAINED BY THIS METHOD

The present invention relates to a method for making cards according to the precharacterizing clause of claim 1 and to a card made by this method. The present invention relates more specifically to a method for making cards, in particular smart cards or bank cards, laminated by cold pressing.

Although the description describes, above all, the particular case of the manufacture of smart cards, the invention may also apply to the manufacture of any other type of laminated cards, for example plasticized bank cards, telephone cards or visiting cards. However, the invention proves more particularly advantageous for making cards intended to be used in a reader or automatic machine, especially for cards comprising an optical, magnetic or electronic storage portion.

Most known smart cards are made by laminating layers of various materials, such as polyvinyl chloride (PVC), polycarbonate (PC) or ABS, at least one of the layers accommodating an integrated circuit. Of the known manufacturing methods, hot-laminating methods and cold-pressing laminating methods are particularly important.

According to hot-laminating methods, the multiple layers forming a card are pressed between two plates and simultaneously heated to a temperature usually close to 160°, making it possible to fuse the layers together. A second cold press is sometimes used after the first, in order to cool the layers as a whole. Such methods are mentioned, in particular, in the patent documents WO 94/22111, DE 4444788, EP0163534 and EP0488754.

These methods are difficult to use in order to make smart cards comprising fragile electronic components which risk being destroyed by the intense heat and high pressure which are necessary. In particular, these methods are unsuitable for making cards comprising an accumulator or battery which does not withstand the intense heat released.

For this reason, cold-pressing laminating methods are sometimes preferred. According to these methods, the various layers forming the cards are assembled together by means of a binder or an adhesive which cures at a temperature below the melting point of the layers forming the card. WO 94/22110 describes an example of a method of this type. The various layers and the circuit are compressed in a press, the thickness and distribution of the binder being accurately controlled.

The outer faces of the card must be perfectly plane. This is particularly the case if the card is to be used in an automatic machine. For this purpose, the card manufacturers employ, for the outer faces, synthetic sheets which have undergone prior surface treatment. This may involve, for example, hot pressing of the synthetic sheets against a smoothing plate, for example against a polished smoothing plate which makes it possible to eliminate surface irregularities. After smoothing, the synthetic sheets are cooled, detached from the polished metal surface and stacked, or sometimes wound on themselves, for the purpose of selling them and transporting them to the card manufacturer. The synthetic sheets obtained must be sufficiently smooth to be used as outer layers of the laminate.

The present invention relates to an improvement to the methods for making cards. In particular, the invention relates to an improvement to these methods which is particularly advantageous when it is applied to making cards intended to be used in automatic machines.

According to the invention, this improvement is afforded by means of the elements of the characterizing clause of claim 1.

More specifically, this improvement is afforded by carrying out the laminating operation by the cold pressing of the various layers and elements forming the laminated card between the smoothing plate, used during the previous hot-pressing smoothing operation, and at least one other plate. In this way, the synthetic sheets forming the outer layers of the laminated card are protected by the smoothing plates during transport and cold pressing. It is thus impossible for the outer surfaces of these sheets to be scratched or be covered with dust before or during the cold-pressing laminating operation.

By cold pressing is meant pressing without the addition of heat or, at least, pressing carried out at a temperature below the melting point of the outer layers of the laminate. If the outer layers are made of PVC, laminating is therefore carried out at a temperature below 140° or, preferably, below 120°.

Other advantages and particular features of the invention may be gathered from the dependent claims and from the description given by way of example and illustrated by the figures, in which:

FIG. 2c shows a diagrammatic section through two synthetic sheets before the hot-smoothing operation, according to a third variant of the invention.

FIG. 3c shows a diagrammatic section through two synthetic sheets during the hot-smoothing operation, according to the third variant of the invention.

FIG. 4c shows a diagrammatic section through two synthetic sheets after the hot-smoothing operation, according to the third variant of the invention.

FIG. 5c shows a diagrammatic section through the various layers forming the card, before the cold-pressing laminating operation, according to the third variant of the invention.

FIG. 6c shows a diagrammatic section through the various layers forming the card, during the cold-pressing laminating operation, according to the third variant of the invention.

FIG. 7c shows a diagrammatic section through a finished card after the cold-pressing laminating operation, according to the third variant of the invention.

FIG. 2d shows a diagrammatic section through a synthetic sheet before the hot-pressing operation, according to a fourth variant of the invention.

FIG. 3d shows a diagrammatic section through a synthetic sheet during the hot-smoothing operation, according to the fourth variant of the invention.

The figures are diagrammatic. It is therefore not generally possible to deduce dimensions from them. In particular, the thickness of the cards in the sectional views has been deliberately exaggerated, in order to show the various layers clearly. In practice, the cards will generally have the standardized ISO dimensions of 53.98×85.60×0.76 mm.

Figure 1:
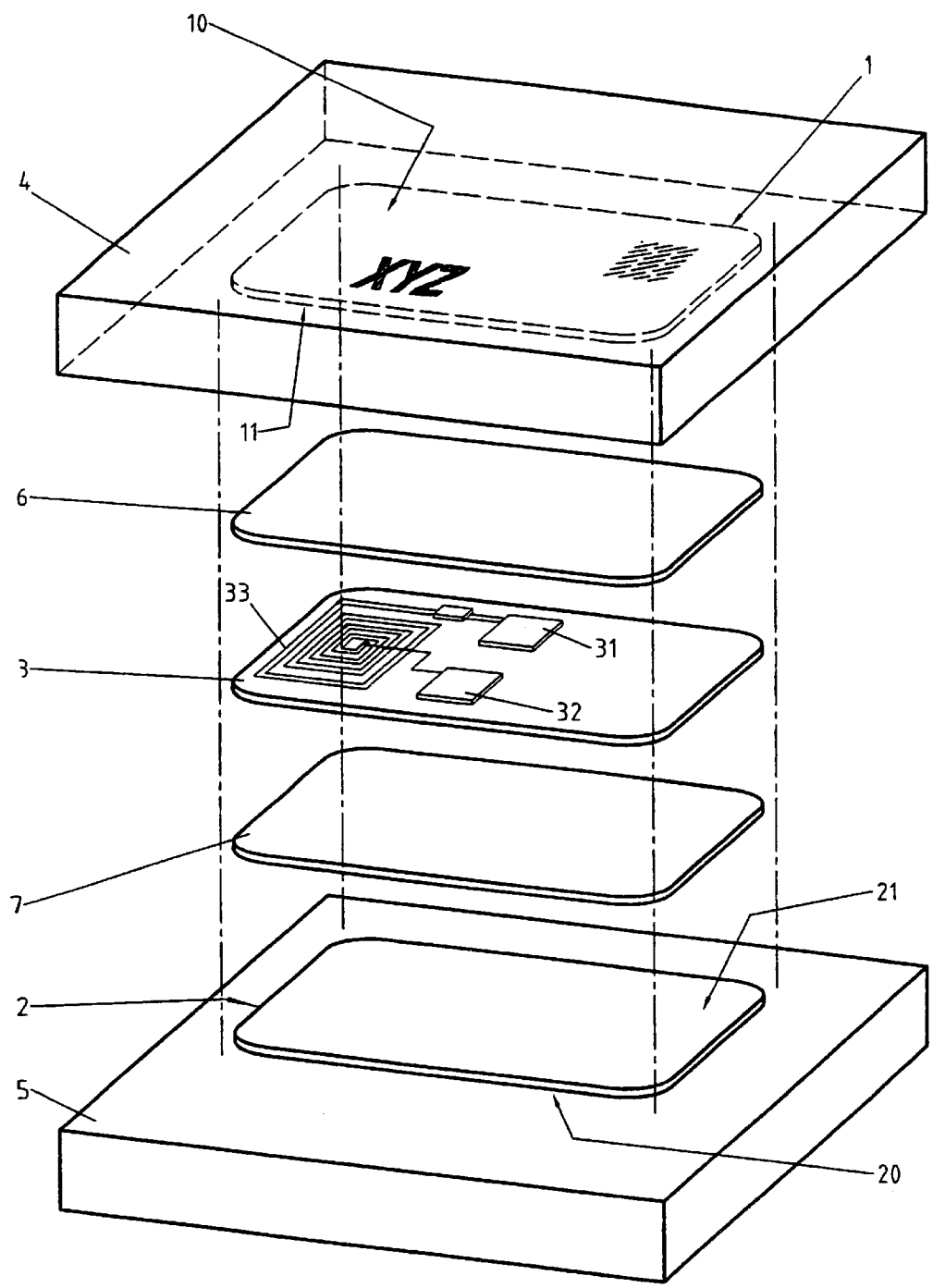
FIG. 1 shows an exploded view of the various layers forming a smart card.

FIG. 1 illustrates an exploded view of various smart card layers made by cold-pressing lamination. The upper layer 1 consists of a synthetic sheet, for example made of polyvinyl chloride (PVC), polycarbonate (PC) or ABS, cut to the required dimensions. The outer face 10 may be printed, for example with the name of the holder and of the banking institution, if a bank card is concerned. In one variant, the upper layer 1 is transparent, and the print may be provided on the inner face 11. The outer face 10 must be as smooth as possible for esthetic reasons, so that the card can easily be read and written in automatic machines and to make printing and subsequent personalization of the card easier.

The lower layer 2 is similar and symmetrical to the upper layer 1; in the same way, the outer face 20, which must be as smooth as possible, may be provided with a print and, if appropriate, with a magnetic or optical data storage zone. The inner face of the layer 2 is designated by the numeral 21.

Where a smart card is concerned, electric contacts may, if necessary, be provided at least on one of the outer faces 10 or 20. Cards are also known, the outer faces of which are provided with photovoltaic cells making it possible to supply an electronic circuit in the card.

The layer 3 is provided with various electronic components 31, 32, 33 illustrated diagrammatically and connected to one another. The electronic components may, for example, comprise integrated circuits, such as memories, microprocessors or microcontrollers, coils, accumulators, etc.

The layers 1, 2 and 3 are held together by means of two binder layers 6 and 7. The layers 6 and 7 may consist, for example, of double-faced adhesive sheets or of a binder in the form of a solid or viscous sheet. It is also possible, however, to use any type of binder, for example a two-component adhesive, a cold adhesive (that is to say, one which cures at a temperature below the melting point of the layers 1 and 2) or a resin which cures in air, under ultraviolet light or by means of photoinitiating agents. The outer layers 1, 2, the surface of which is critical, rest, during cold pressing, on the smoothing plates 4, 5 used for smoothing the outer layers 10, 20. Pressure is exerted on the layers 1 to 7 in order to bind them and ensure good adhesion.

This smart card configuration is given only as an illustrative example. Depending on requirements, the invention may also apply to smart cards comprising different layers, for example positioning layers, compressible layers, layers of other electronic elements, etc. The invention also applies to the manufacture of cards formed solely from two outer layers 1, 2 laminated relative to one another. It is also possible to use the invention in order to make cards formed from two outer layers 1, 2 assembled together by means of a binder layer 6 coating various electronic components.

Figure 2A:
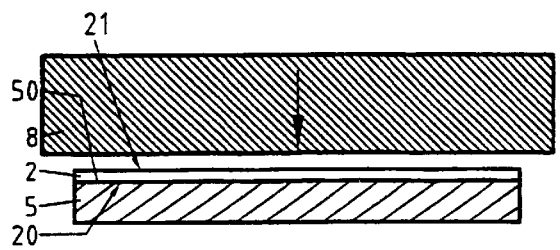
FIG. 2a shows a diagrammatic section through the second synthetic sheet before the hot-smoothing operation, according to a first variant of the invention.
Figure 3A:
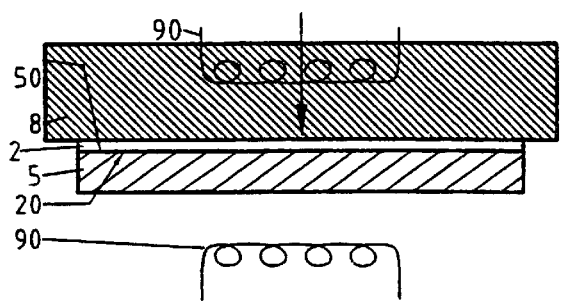
FIG. 3a shows a diagrammatic section through a synthetic sheet during the hot-smoothing operation, according to the first variant of the invention.

FIGS. 2a and 3a illustrate the operation of smoothing the lower layer 2 by hot pressing. The synthetic sheet 2 is first placed on a smoothing plate 5. The smoothing plate 5 preferably consists of a stainless steel plate with a polished or satin-finished upper surface 50; a pressing plate 8 makes it possible to apply pressure (symbolized by an arrow) to the sheet 2. The covering of the plate 8 is nonadhesive; it is not necessary for it to be particularly polished. In order to make it easier for the synthetic sheet 2 to be subsequently detached, it is possible to use a nonadhering intermediate sheet between the pressing plate 8 and the sheet 2, for example a nonadhering polyamide film. If the smoothing plate 5 is too thin to support the pressure of the pressing plate 8 without undergoing deformation, a support plate, not illustrated, will be used under the smoothing plate 5. Heating means 90 are provided for softening the sheet 2. The heating means are represented, here, by an electric filament; however, other means may be used, for example steam heating, etc. The selected pressure and temperature depend on the material used for the sheet 2; however, since, in this variant, no electronic component is mounted on the sheet 2 during heating, it is possible to employ temperatures higher than the melting point of the synthetic sheet 2, preferably temperatures of the order of 150° or even higher than 180° C. In order to avoid deformations and tensions in the sheet 2, the heat is simultaneously applied from each side of the sheet 2. In this way, the outer face 20 of the sheet 2 is smoothed by molding against the polished surface 50. Additional means may be provided for cooling the sheet 2 rapidly after the hot-pressing operation.

In a new variant, not illustrated, the smoothed synthetic sheet 2 is obtained by spraying or coating with an acrylic varnish or with another synthetic covering against the smoothing plate 5. If necessary, the pressing plate 8 is lowered after spraying or coating, so as to make the thickness of the varnish layer uniform. No addition of heat is necessary for the curing of the varnish. A thin varnish layer is thus obtained, which is sufficiently smooth and uniform to serve as an outer layer 1, 2.

In the prior art, the sheet 2 was subsequently detached from the smoothing plate 5, then transported to the cold-laminating machine which may possibly be situated in another factory. The same procedure was adopted for the synthetic sheet 1. The sheets 1, 2 were often damaged during transport between the smoothing machine and the cold-pressing laminating machine. The sheets may be scratched, and dust or impurities risk adhering to the outer faces 10 or 20. These impurities produce marks on the surface 10, 20 during laminating by cold pressing. Moreover, it is difficult for the sheets 1 and 2 to be laid against the pressing plates of the cold press without any air bubbles. These air bubbles are obviously detrimental to the planeness of the card obtained.

Figure 4A:
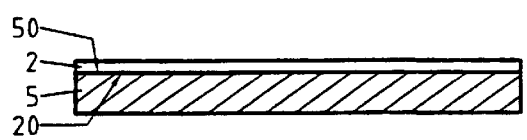
FIG. 4a shows a diagrammatic section through a synthetic sheet after the hot-smoothing operation, according to the first variant of the invention.
Figure 5A:
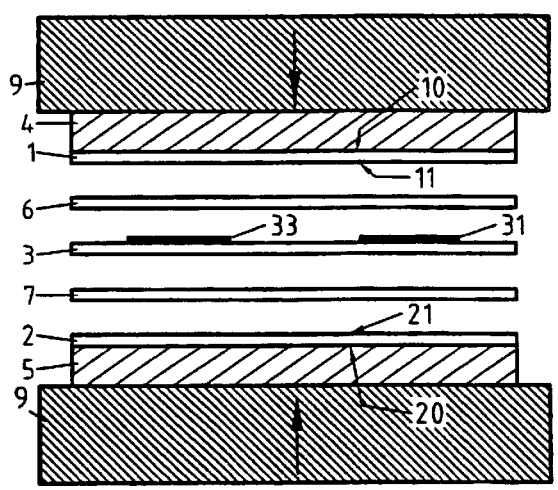
FIG. 5a shows a diagrammatic section through the various layers forming the card, before the cold-pressing laminating operation, according to the first variant of the invention.
Figure 6A:
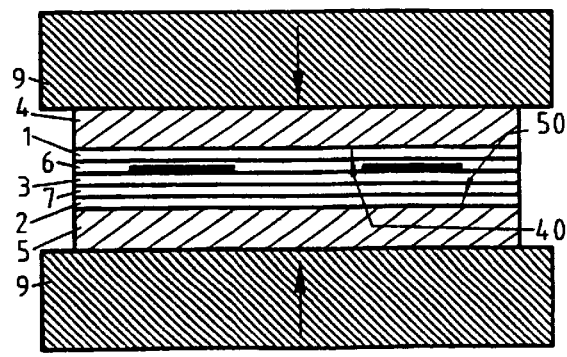
FIG. 6a shows a diagrammatic section through the various layers forming the card, during the cold-pressing laminating operation, according to the first variant of the invention.

In a first variant of the invention, these problems are solved by means of the steps of the method which are illustrated in FIGS. 4a, 5a and 6a. After smoothing, the pressing plate 8 is raised (FIG. 4a), but the sheet 2 is not detached from the metal smoothing plate 5. In the same way, the upper sheet 1 is not detached from the corresponding smoothing plate 4. The sheets 1, 2 remain laid on the smoothing plates 4, 5 between the smoothing operations and the laminating operations. If the synthetic sheets have to be transported to another machine, the smoothing plates 4, 5 are demounted and transported together with the synthetic sheets. The outer faces 10, 20 thereby remain completely protected from impurities and scratches.

Lamination is carried out by the various layers 1, 2, 3, 6, 7 which form the laminate being superposed in the appropriate way (FIG. 5a), the outer layers 1 and 2 remaining on their respective smoothing plates 4 and 5. The stack of layers together with the plates 4 and 5 is subsequently compressed between two plates 9 in a cold press (FIG. 6a). It is only after this operation of cold lamination and curing of the binder that the smoothing plates 4, 5 are finally detached (this is not illustrated).

After the smoothing plates 4, 5 have been removed, the stack of layers which is obtained may, if necessary, be cut to the prescribed card dimensions by means of known methods.

Figure 2B:
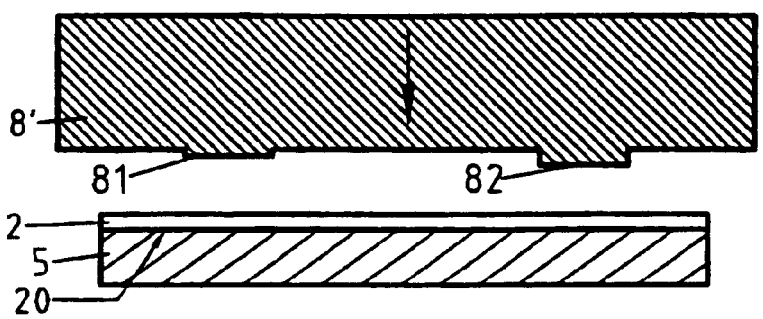
FIG. 2b shows a diagrammatic section through the various layers forming the card, before the hot-smoothing operation, according to a second variant of the invention.
Figure 3B:
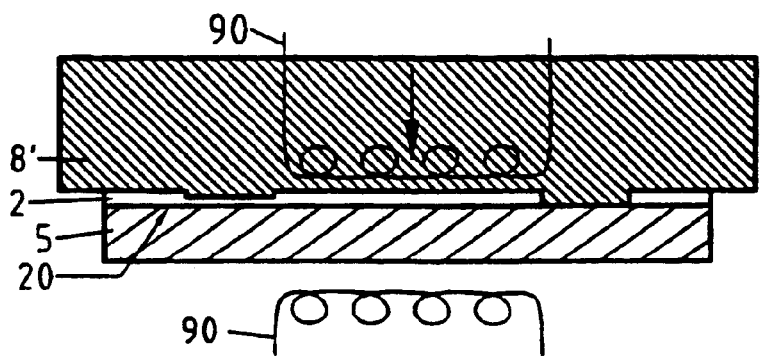
FIG. 3b shows a diagrammatic section through a synthetic sheet during the hot-smoothing operation, according to the second variant of the invention.
Figure 4B:
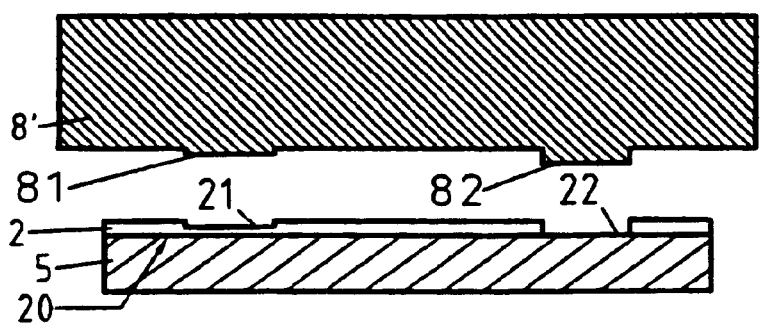
FIG. 4b shows a diagrammatic section through a synthetic sheet after the hot-smoothing operation, according to the second variant of the invention.

FIGS. 2b, 3b and 4b illustrate a variant of the steps of smoothing by hot pressing. These steps may be used instead of the steps illustrated in FIGS. 2a, 3a and 4a, particularly for the manufacture of smart cards comprising electronic components of a particular thickness. In this case, as seen in FIG. 2b, a pressing plate 8' with projecting portions, here two portions 81, 82, will preferably be used. When the pressing plate 8' is lowered against the smoothing plate 5, the projecting portions penetrate and mark the inner face 21 of the sheet 2 (FIG. 3b). The pressing plate 8' functions, in fact, as a stamping punch which pushes back or cuts out particular portions of the synthetic sheet 2. The heating means 90 make it possible to soften the synthetic sheet 2. In this example, the two projecting portions 81 and 82 illustrated are of different height, so that the projection 81 penetrates only a little depth into the synthetic sheet 2, whereas the higher projection 82 passes completely through the sheet. If necessary, the projection 82 may be provided with cutting edges, so as actually to cut out the synthetic sheet 2. In one variant, the projection 82 may be replaced by a projecting blade having solely a cutting contact surface with the sheet 2.

In addition to the projections 81, 82, the pressing plate 8' may also comprise a three-dimensional relief structure. This structure makes it possible to reduce the tensions and deformations attributable to the pressing of the synthetic sheet 2.

FIG. 4b shows the imprint left by the pressing plate 8' in the synthetic sheet 2. The projection 81 has left only a shallow recess 21 on the inner face 21, whereas the orifice 22 left by the projection 82 passes through the synthetic sheet 2. The recess 21 will have been provided opposite an electronic component, subsequently mounted in the card, and makes it possible to use relatively thick components, without causing a bulge in the outer faces 10, 20 of the finished smart card. The orifice 22 makes it possible, for example, to access the contacts of a component mounted in the card. It goes without saying that any number of recesses and/or orifices may be provided, as required, on the two outer faces of the smart card.

The synthetic sheet 2 thus smoothed and stamped is laminated, as in FIGS. 5a and 6a, with the other layers forming the finished card. It goes without saying that similar recesses or orifices may also be provided in the other outer sheet 1. An additional operation of welding, connecting and/or fastening additional components in the orifice 22 may be provided, if appropriate.

FIGS. 2c to 7c illustrate steps in the manufacture of a smart card according to a third variant of the invention. These steps may replace the steps described above with reference to FIGS. 2a to 6a respectively. In this variant, the synthetic sheet 2 is cut beforehand at the appropriate locations 24 during operations which are not illustrated, in order to allow the connecting contacts 34 of an electronic component 31 to pass through. The synthetic sheet 2 is positioned, as before, on the polished metal smoothing plate 5, and the electronic component 31 is placed in the orifice 24, with its connecting contacts 34 laid on the plate 5. A second synthetic sheet 2' is subsequently applied over the sheet 2. The second sheet 2' likewise has orifices 24' which are slightly smaller than the orifices 24, but are placed at the same locations, in such a way that the sheet 2' covers particular portions of the circuit 31. It is possible to change the order of these operations slightly by inserting the component or components 31 into the corresponding orifices 24' of the sheet 2' beforehand. It is subsequently sufficient, in a single operation, to apply the sheet 2' provided with the components 31 over the sheet 2.

The second synthetic sheet 2' may be of the same material as the first sheet 2 or of a different material. It prevents the component 31 from being buried toward the interior of the card, so as to keep the contacts 34 flush with the outer face 20. Moreover, the second sheet 2' improves the sealing of the orifice 24, 24' around the component 31.

In FIG. 3c, pressure is applied to the layers 2, 2' by the pressing plate 8'' and the smoothing plate 5, in order to smooth the outer face 20. The pressing plate 8'' comprises a receptacle 83, in order to avoid the crushing of the circuit 31. Heating means 90' are provided for softening the sheet 2 and also for fusing the two synthetic sheets 2, 2'. The heating temperature and duration employed will be selected so as to prevent any risk of the component 31 being destroyed. Means, not illustrated, for example radiator fins or an air stream, may be provided in order to cool the component 31 during this heating operation. If, depending on the component selected, it is impossible for the sheets 2, 2' to be sufficiently heated to cause them to fuse sufficiently, a double adhesive sheet 2' or a layer of adhesive or of resin between the two layers 2, 2' will preferably be used.

In FIG. 4c, the pressing plate 8'' is subsequently raised, whilst the two sheets 2, 2' and the component 31 remain on the smoothing plate 5. Connecting wires 36 may be welded at this moment, in order to connect the electronic component 31 to other components in the smart card, for example to a coil. A binder 6' is subsequently poured over the layer 2'. Depending on the fluidity of the binder selected, a positioning frame (not illustrated) around the card will be employed. The binder may, for example, consist of one of the materials mentioned by way of example above. It is, of course, possible, however to use a binder in the form of a solid sheet or a double-faced adhesive sheet, as illustrated in the preceding variants.

The other layers of the laminate are subsequently applied (FIG. 5c). In this example, only the outer sheet 1 with its smoothing plate 4 is applied over the binder layer 6'. This sheet was smoothed beforehand by hot pressing on the plate 4. Other layers may, of course, be provided, for example a printed circuit layer with other electronic components. Various electronic components may be embedded in the binder layer 6' before curing. During the step illustrated in FIG. 6c, pressure is applied by the plates 9 to the stack of layers which is obtained. The excess binder 6' can flow off laterally during this step.

FIG. 7c illustrates diagrammatically the card obtained after the curing of the binder, the detachment of the smoothing plates 4 and 5 and, if appropriate, cutting out. This method makes it possible to obtain perfectly plane outer faces 10, 20 flush with the contacts 34 of the component 31.

FIGS. 2d and 3d illustrate a variant of the steps of the hot-pressing smoothing of a sheet already provided with an electronic component 31. These steps may replace the steps of the third variant which are illustrated in FIGS. 2c and 3c. Here, the component 31 is held flush with the outer face 20 by means of the frustoconical portion 35 of said component.

Other mechanical fastening systems, for example any other form of protuberance on the lateral surface of the component 31, may, of course, be envisaged. The component 31 is first placed on the smoothing plate 5, then the synthetic sheet 2 is slipped over the component 31, with a little force being applied in the region of the orifice 24 previously cut out in the sheet 2. During the step illustrated in FIG. 3e, the pressing plate 8" is lowered so as to exert pressure on the synthetic sheet 2 which is simultaneously fused by the heating means 90'. The orifice 24 is thereby matched to the frustoconical shape 35 of the component 31; the latter can no longer be buried toward the interior of the card. The cold laminating of the synthetic sheet 2 thus smoothed and provided with a circuit 31 may subsequently be carried out in the way described in FIGS. 4a to 6a or in the way described in FIGS. 4c to 6c. As compared with the preceding variant, this solution makes it possible to save a synthetic sheet 2' and, where appropriate, reduce the thickness of the card.

Although, above all, a method for making cards one by one was illustrated above, all the variants also apply to the simultaneous manufacture of a plurality of cards from sheets 1, 2, 2' of sufficient dimensions, which will be cut during a final operation which is not illustrated. Continuous manufacture from laminates of sheets, for example PVC sheets, is also perfectly conceivable. In this case, the unwound laminates are first hot-pressed in successive portions, one portion corresponding to one or more individual cards. The portions thus smoothed are subsequently cold-laminated over the polished plate used for hot pressing, in a similar way to FIGS. 4 to 7.

Hot smoothing was discussed above mainly in connection with the lower layer 2. In some uses, only one of the two faces 10, 20 of the card needs to be perfectly plane. This applies, for example, when only one of the faces of the card is subsequently to be printed or provided, for example, with a magnetic or optical storage zone (bar code) or with connecting contacts. In general, however, it is necessary and preferable to use smoothed synthetic sheets for both faces 1, 2 of the card. In this case, the upper sheet 1 will be treated in the same way as the lower sheet 2.

Figure 8:
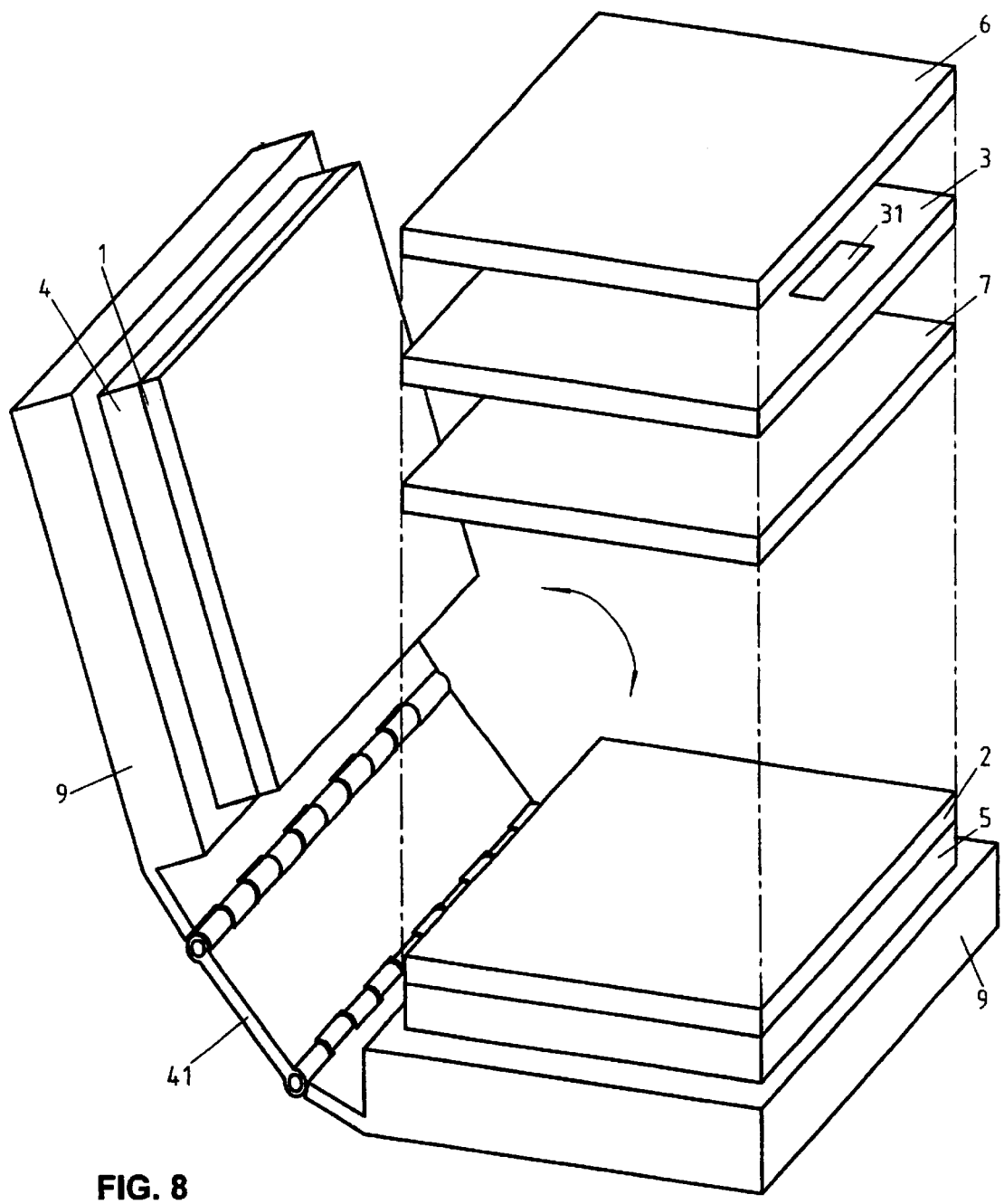
FIG. 8 shows a perspective view of means for superposing the sheets.

Many means are conceivable for transporting the smoothed synthetic sheets 1 and 2 to the laminating machine and for superposing them for the purpose of laminating them. The sheets may be smoothed and laminated at very different locations and moments, provided that they can be stored and transported together with the smoothing plates 4, 5. FIG. 8 illustrates an advantageous possibility employing a single press for smoothing the synthetic sheets 1 and 2 and for laminating them with the other layers. The two sheets 1 and 2 are smoothed beforehand against two polished smoothing plates 4 and 5 placed side by side. A pressing plate 8, not illustrated, and heating means 90, not illustrated, are used to smooth the surfaces 10, 20. This arrangement makes it possible simultaneously to heat and apply pressure to the two sheets 1 and 2. It is possible to employ a common pressing plate 8 of double dimension or at least two separate plates in order to smooth the two synthetic sheets 1, 2.

After smoothing, the sheets are cooled, then the intermediate layers 7, 3 and 6 are positioned above the lower layer 2. The upper sheet 1 and its smoothing plate 4 are subsequently overturned above the stack of intermediate layers, at the same time being pivoted about a hinge 41, in the manner of a book which is being closed. The hinge 41 is preferably a double hinge or another type of hinge making it possible to superpose the two sheets 1 and 2 without any offsets. In order to bind the layers together, pressure is applied by means of the pressing plates 9 to the two smoothing plates 4, 5 which are closed in the same way as the cover of a book. In order to prevent the sheet 1 from slipping when the smoothing plate 4 is being closed, care will be taken to use a smoothing plate 4 provided with a polished upper surface which is slightly adhesive or is charged with static electricity. Suction means may be provided, if appropriate, in order to lay the sheet 1 against the smoothing surface, this means then acting through holes passing through the smoothing plate 4 in zones not corresponding to the cut-out cards. This measure may prove necessary, in particular, if sheets 1, 2 of large dimension, corresponding to a plurality of cards, are laminated during each operation. In one variant, a plurality of separate sheets, each corresponding to a plurality of cards, may be laminated simultaneously.

In all the variants, the smoothing plates 4 and 5 may be produced from any sufficiently smooth material, for example from stainless steel or Teflon (registered trademark). The smoothing surface is preferably perfectly polished and/or satin-finished. In one variant, it is also possible to use smoothing plates 4, 5 having at least one slightly rough or granulated portion. Depending on the texture imparted to the roughnesses of the rough or granulated portion, it is possible to obtain outer surfaces 10, 20 of varied appearance. For example, it is possible to make cards having a perfectly smooth face, with the exception of particular portions, corresponding, for example, to a text or logo, which have a matt or rough appearance. Moreover, the smoothing plates may, for some uses, comprise projecting portions intended for molding, in at least one face of the card, a recess which may, for example, be used in order to insert a photograph, a hologram or any security element.

The different variants discussed above may, to a large extent, be combined with one another, as required. For example, a pressing plate 8' forming a stamping punch (cf. FIGS. 2b–3b–4b) may be used with all the variants, instead of plane plates 8, 8'.

What is claimed is:

1. Method for making laminated cards, comprising the following operations:
    smoothing by hot pressure on a smoothing press of at least one first synthetic sheet (1) against a first smoothing plate (4),
    removing said first smoothing plate (4) together with said first synthetic sheet (1) from the smoothing press,
    applying said first smoothing plate (4) together with said first synthetic sheet (1) on a laminating press, and
    lamination of at least one card using said first synthetic sheet (1) as the outer layer on said laminating press by pressing of various layers (1, 6, 6', 3, 7, 2, 2') and elements (31, 32, 33) between said first smoothing plate (4) and a second plate (5), said pressing being carried out at a temperature below the melting point of the first synthetic sheet.

2. Method for making laminated cards according to claim 1, characterized in that it comprises, furthermore, an operation of smoothing a second synthetic sheet (2) against a second smoothing plate (5), in order to improve the surface state of the outer face (20) of said second synthetic sheet, in that said second synthetic sheet (2) is used as the second outer layer of said card, and in that said laminating operation is carried out by the cold pressing of the various layers (1, 6, 6', 3, 7, 2, 2') and elements (31, 32, 33) forming the laminated card between said first smoothing plate (4) and said second smoothing plate (5).

3. Method for making laminated cards according to claim 2, characterized in that the smooth synthetic sheet (1) is formed by spraying or coating a synthetic covering against a smoothing plate (4 or 5).

4. Method for making laminated cards according to claim 2, characterized in that the second smoothing plate (5) as well as the first smoothing plate (4) are mounted on a same smoothing press.

5. Method for making laminated cards according to claim 2, wherein said synthetic sheet or sheets (1, 2) have a size corresponding to a plurality of cards, said method comprising an operation of cutting out individual cards.

6. Method for making laminated cards according to claim 5, wherein said synthetic sheet or sheets (1, 2) each consist of a continuous synthetic web.

7. Method for making laminated cards according to claim 2, wherein the face of at least one of said smoothing plates (4 or 5) which is opposite the corresponding synthetic sheet (1 or 2) comprises a three-dimensional pattern intended to be printed in relief on the corresponding synthetic sheet.

8. Method for making laminated cards according to claim 7, wherein said three-dimensional pattern comprises polishing in variable directions or with variable roughnesses, so as to imprint a visible pattern on the corresponding synthetic sheet (1, 2).

9. Method for making laminated cards according to claim 8, wherein at least one of the first (4) and/or second (5) smoothing plates is made of polished or satin-finished stainless steel.

10. Method for making laminated cards according to claim 2, comprising a prior step of printing on at least one of the first and/or second synthetic sheets (1, 2).

11. Method for making laminated cards according to claim 2, wherein the inner face (11 or 21) of at least one of said synthetic sheets (1 or 2) is previously machined with at least one recess intended for receiving a component or components (31, 32, 33) contained in the card.

12. Method for making laminated cards according to claim 2, wherein, during at least one of said smoothing operations, at least one of said synthetic sheets (1 or 2) is pressed between the corresponding smoothing plate (4 or 5) and a pressing plate (8') comprising a three-dimensional structure in relief.

13. Method for making laminated cards according to claim 12, wherein, during at least one of said smoothing operations, at least one of said synthetic sheets (1 or 2) is pressed between the corresponding smoothing plate (4 or 5) and a pressing plate (8') comprising at least one projecting portion (81) intended for molding in the inner face (11 or 21) of the synthetic sheet a recess (21) and/or an orifice (22) corresponding to the placement of an electronic component (31, 32) of the finished card.

14. Method for making laminated cards according to claim 2, wherein an electronic component (31) is previously positioned with its connecting contacts (34) flush with the outer face (10 or 20) of at least one of said synthetic sheets (1 or 2).

15. Method for making laminated cards according to claim 14, wherein holding means (2'; 35) are provided for holding the connecting contacts (34) of said electronic component (31) flush with the outer face (10 or 20) of the corresponding synthetic sheet (1 or 2).

16. Method for making laminated cards according to claim 15, wherein said holding means consist of an additional synthetic sheet (2').

17. Method for making laminated cards according to claim 15, wherein said holding means consist of a projecting portion (35) on the lateral face of the electronic component (31).

18. Method for making laminated cards according to claim 2, comprising, between the smoothing and laminating operations, an additional operation of welding electronic components (31).

19. Method for making laminated cards according to claim 2, wherein said first and second synthetic sheets (1, 2) are smoothed on smoothing plates placed side by side and are articulated so as to be capable of being closed in the same way as the cover of a book, so as to superpose said synthetic sheets (1, 2) in order to carry out said operation of laminating the various layers (1, 6, 6', 3, 7, 2, 2') and elements (31, 32, 33) forming the laminated card.

20. Card made by the method of claim 1.

21. Smart card made by the method of claim 1.

* * * * *